US 11,573,355 B2

(12) United States Patent
Rudolph et al.

(10) Patent No.: US 11,573,355 B2
(45) Date of Patent: Feb. 7, 2023

(54) IMAGING DEVICE, HEAD-MOUNTED DISPLAY, AND METHOD FOR GENERATING AN IMAGE FROM AN ORIGINAL IMAGE IN A HEAD-MOUNTED DISPLAY

(71) Applicant: tooz technologies GmbH, Aalen (DE)

(72) Inventors: Guenter Rudolph, Jena (DE); Hans-Juergen Dobschal, Kleinromstedt (DE); Matthias Hillenbrand, Jena (DE)

(73) Assignee: tooz technologies GmbH, Aalen (DE)

( * ) Notice: Subject to any disclaimer, the term of this patent is extended or adjusted under 35 U.S.C. 154(b) by 425 days.

(21) Appl. No.: 16/618,236

(22) PCT Filed: May 25, 2018

(86) PCT No.: PCT/EP2018/063803
§ 371 (c)(1),
(2) Date: Nov. 29, 2019

(87) PCT Pub. No.: WO2018/219816
PCT Pub. Date: Dec. 6, 2018

(65) Prior Publication Data
US 2020/0116907 A1    Apr. 16, 2020

(30) Foreign Application Priority Data

May 29, 2017   (DE) .......................... 102017111607.9

(51) Int. Cl.
*G02B 5/04*     (2006.01)
*G06F 1/16*     (2006.01)

(52) U.S. Cl.
CPC ................ *G02B 5/04* (2013.01); *G06F 1/163* (2013.01)

(58) Field of Classification Search
CPC .. G02B 27/01; G02B 27/017; G02B 27/0101; G02B 27/0172; G02B 27/0178;
(Continued)

(56) References Cited

U.S. PATENT DOCUMENTS

| | | | |
|---|---|---|---|
| 10,436,951 | B2 | 10/2019 | Benitez et al. |
| 2001/0033401 | A1 | 10/2001 | Kasai et al. |

(Continued)

FOREIGN PATENT DOCUMENTS

| | | |
|---|---|---|
| DE | 102012206472 A1 | 10/2013 |
| DE | 102013206614 A1 | 10/2014 |
| DE | 102013207257 A1 | 10/2014 |

*Primary Examiner* — Sultan Chowdhury
(74) *Attorney, Agent, or Firm* — Skaar Ulbrich Macari, P.A.

(57) ABSTRACT

An imaging apparatus for smartglasses includes an image generator element arrangement having a number of image generator elements, on which a corresponding number of original partial images is represented, a number of imaging channels comprising in each case at least one image-forming reflection surface and/or at least one image-forming refraction surface, said number corresponding to the number of image generator elements, wherein each of the imaging channels is associated with one of the image generator elements and transmits one of the original partial images, and a spectacle lens, which is common to all imaging channels and via which the imaging channels are directed in the direction of an observer's eye. The image-forming reflection surfaces and/or refraction surfaces of the imaging channels are surfaces of a prism that is arranged on the spectacle lens.

23 Claims, 10 Drawing Sheets

(58) Field of Classification Search
CPC .. G02B 27/0093; G02B 27/14; G02B 27/283; G02B 5/04; G02B 5/045; G02B 5/18; G02B 5/20; G02B 5/1814; G02B 5/1828; G06F 3/011; G06F 3/012; G06F 3/14; G06F 3/013; G06F 3/147
See application file for complete search history.

(56) References Cited

U.S. PATENT DOCUMENTS

| | | |
|---|---|---|
| 2008/0316606 A1 | 12/2008 | Inoguchi et al. |
| 2011/0228231 A1 | 9/2011 | Schreiber et al. |
| 2011/0304825 A1 | 12/2011 | Sieler et al. |
| 2013/0069260 A1 | 3/2013 | Buchon et al. |
| 2013/0187836 A1 | 7/2013 | Cheng et al. |
| 2014/0146290 A1 | 5/2014 | Sieler et al. |
| 2015/0062446 A1 | 3/2015 | Schreiber et al. |
| 2015/0085259 A1 | 3/2015 | Schreiber et al. |
| 2015/0346495 A1* | 12/2015 | Welch ................. G02B 27/017 345/8 |
| 2016/0065921 A1 | 3/2016 | Sieler et al. |
| 2016/0306171 A1 | 10/2016 | Rudolph et al. |
| 2017/0276918 A1* | 9/2017 | Hua ....................... G02B 17/08 |
| 2018/0003978 A1* | 1/2018 | Benitez ............. G02B 27/0172 |
| 2018/0231832 A1* | 8/2018 | Liu ................... G02F 1/133553 |
| 2019/0179409 A1* | 6/2019 | Jones ................. G02B 27/0176 |

* cited by examiner

IMAGING DEVICE, HEAD-MOUNTED DISPLAY, AND METHOD FOR GENERATING AN IMAGE FROM AN ORIGINAL IMAGE IN A HEAD-MOUNTED DISPLAY

PRIORITY

This application claims the benefit of German Patent Application No. 10 2017 111607.9, filed on May 29, 2017, and which is hereby incorporated herein by reference in its entirety.

FIELD

The present invention relates to an imaging apparatus and to smartglasses and to a method for generating an image from an original image in smartglasses.

BACKGROUND

One example of smartglasses is described in DE 10 2013 223 963 A1. In these smartglasses, the image of an image generator is coupled, via a prismatic base, into a spectacle lens, from where it is guided to an output coupling structure, which is arranged in the spectacle lens and couples the imaging beam path out in the direction of the eye of a user wearing the smartglasses. The prismatic base can here form an integrally formed part with the spectacle lens, for example by producing it together with the spectacle lens, or the spectacle lens and the prismatic base are produced separately and then cemented together. But the prismatic base can also be arranged separately in the frame of the smartglasses.

Imaging and optical corrections of the imaging are here primarily accomplished by way of freeform surfaces of the prismatic base, the sizes of which—and consequently the size of the prismatic base—substantially depend on the required size of the eye box and the desired field angles. The eye box in this context is understood to mean the three-dimensional region of the light tube in the imaging beam path in which the eye pupil can move without vignetting the image. Since, in smartglasses, the distance of the eye in relation to the smartglasses is substantially constant, the actual three-dimensional eye box can be reduced to a two-dimensional eye box that merely takes account of the rotations of the eye. In this case, the eye box substantially corresponds to the exit pupil of the smartglasses at the site of the entrance pupil of the eye. The latter is generally represented by the eye pupil.

A large eye box is typically associated with large dimensions of the prismatic base, because the required optical imaging quality in the case of a large eye box necessitates large imaging surfaces, that is to say large reflection surfaces and large refraction surfaces.

DE 10 2013 207 257 A1 discloses a display apparatus, which may be in the form of smartglasses and in which a large field of view with a large viewing angle is provided. This is accomplished by way of the image generator unit that displays the image having a plurality of portions that produce in each case only one local partial region of the image that is to be imaged. In addition, a separate imaging channel, in which in each case one imaging element of an imaging optical unit that is arranged downstream of the image generator unit is arranged, is assigned to each portion of the image generator unit in the imaging optical unit. Imaging via the imaging channels is effected here such that the virtual partial images together form a virtual image that a user can perceive. In this way, the lens element diameters of the lens elements used in the imaging optical unit from DE 10 2013 207 257 A1 can be decreased.

SUMMARY

An object herein is to provide, for a given eye box and for given field angles, an imaging apparatus for smartglasses that can have a compact design. Moreover, it is an object herein to provide compact smart glasses with a given eye box and given field angles. Finally, it is an object herein to provide a method for generating an image from an original image in smartglasses that makes it possible to realize a compact design of the imaging apparatus of the smartglasses with a given eye box and given field angles.

An imaging apparatus for smartglasses generates an image from an original image, which is divided into at least two original partial images. The imaging apparatus can comprise:
- an image generator element arrangement having a number of image generator elements, on which a corresponding number of original partial images is represented,
- a number of imaging channels comprising in each case at least one image-forming reflection surface and/or at least one image-forming refraction surface, said number corresponding to the number of image generator elements, wherein each of the imaging channels is associated with one of the image generator elements and transmits one of the original partial images, and
- a spectacle lens, which is common to all imaging channels and via which the imaging channels are directed in the direction of an observer's eye.

The imaging apparatus can be characterized in that the image-forming reflection surfaces and/or refraction surfaces of the imaging channels are surfaces of a prism that is arranged on the spectacle lens.

Owing to the configuration of the image-forming reflection and/or refraction surfaces as surfaces of a prism, which is arranged on the spectacle lens, the reflection surfaces and/or refraction surfaces for a given eye box and given field angles can have a particularly compact design. Owing to the plurality of imaging channels, different original partial images of the original image are imaged into different regions of the eye box, such that the eye box is completely filled by way of all the original partial images. Owing to the opening angles of the beams, which are transmitted by the individual imaging channels, being reduced due to the division, the radii of curvature of the image-forming reflection surfaces and/or refraction surfaces can be reduced as compared to a beam having a large opening angle, as would occur in the case of the transmission of the entire image by a single imaging channel for the given eye box and the given field angles. Owing to the radii of curvature being reduced as compared to the transmission of the imaging beam path via a single imaging channel, the corresponding surfaces are easier to produce with a high optical quality.

The original partial images of at least two image generator elements can represent image sections of the original image with partially overlapping image regions, wherein the overlapping image regions are transmitted via at least two different imaging channels. In this way, the number of image generator elements can be kept relatively small. It is advantageous if image generator elements located at the periphery of the image generator element arrangement have a smaller image generator surface than image generator elements that are located further in the center of the image generator element arrangement. Image generator elements located at the periphery of the image generator element arrangement represent smaller image sections of the original image than image generator elements that are located further in the center of the image generator element arrangement. In this way, it can be ensured that, despite the overlap of the image regions of image sections that are represented on different image generator elements, a uniform brightness distribution is present in the virtual image perceived by the user. In particular, a central image generator element can be present here which represents the entire original image as an image section.

In a first configuration of the imaging apparatus, the image generator element arrangement is formed by a number of separate image generators, with each of the separate image generators forming one image generator element of the image generator element arrangement. In an alternative configuration, the image generator element arrangement is, in contrast, formed by a single image generator, wherein the image generator elements are image generator regions of the image generator on which in each case a different one of the original partial images is represented.

In the imaging apparatus, the prism can comprise a prism entrance surface, facing the image generator element arrangement, and a prism exit surface, facing a spectacle lens entrance surface of the spectacle lens, wherein the imaging channels are coupled out of the prism via the prism exit surface and coupled into the spectacle lens via the spectacle lens entrance surface. It is advantageous here if each imaging channel comprises a portion of the prism entrance surface and a portion of the prism exit surface as image-forming refraction surfaces and an image-forming reflection surface, which is located between its portion of the prism entrance surface and its portion of the prism exit surface, is present for each imaging channel. In addition, each imaging channel can also comprise a portion of the spectacle lens entrance surface as an image-forming refraction surface.

Smartglasses can comprise at least one imaging apparatus. If a virtual image is to be generated using the smartglasses for each eye of an observer, the smartglasses can also comprise two imaging apparatuses—one for each eye.

A method for generating an image from an original image in smartglasses comprising an imaging apparatus is additionally provided. In the method, an original image is divided into a number of original partial images. Each of the original partial images is then transmitted via a separate imaging channel that is formed in the prism to generate the virtual image. At least two original partial images can represent here image sections of the original image with overlapping image regions, such that the overlapping image regions of the image sections are transmitted via at least two different imaging channels. As has already been stated with reference to the imaging apparatus, it is advantageous here if original partial images located at the periphery of the original image represent smaller image sections of the original image than original partial images located further in the center of the original image. A central original partial image can represent in particular the entire original image as an image section.

The advantages attainable with the method have already been described with reference to the imaging apparatus. Therefore, reference is made to that part of the description.

Further features, characteristics and advantages are evident from the following description of exemplary embodiments with reference to the attached figures.

Figure 1:
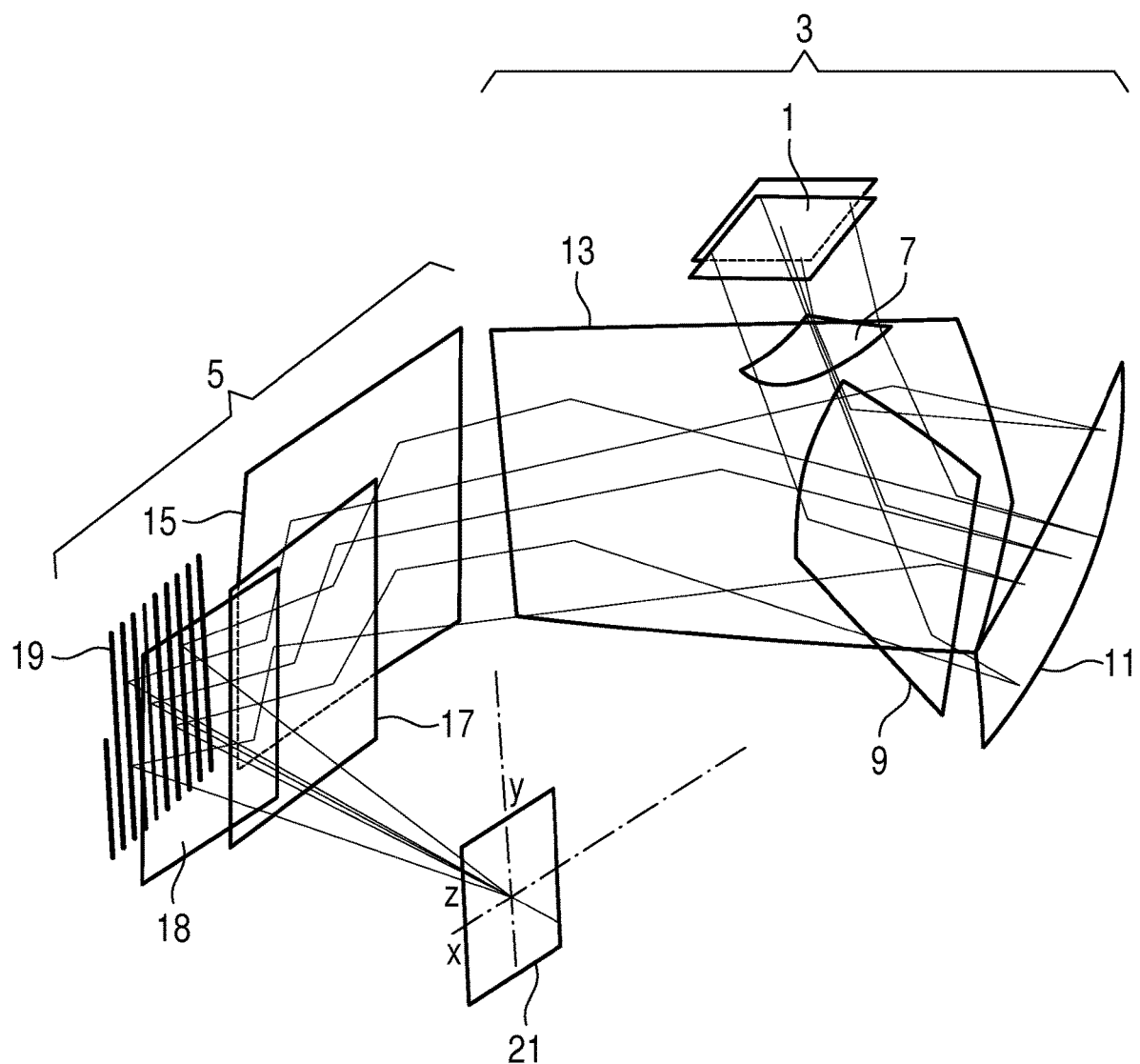
FIG. 1 shows the main surfaces of smartglasses in which the imaging beam path is guided, via reflection at the spectacle lens inner surface and the spectacle lens outer surface, to an output coupling element, from which the beam path is coupled out in the direction of the eye of a user wearing the smartglasses.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 shows the surfaces of an imaging optical unit for smartglasses in accordance with the prior art that are relevant for imaging, light guiding, and input and output coupling of the imaging beam path. For the sake of clarity, the outer edges of the spectacle lens and of the prismatic part of the imaging apparatus have been omitted. The chief rays of the imaging beam path for the corner points and the center of the image generator are also shown.

The imaging apparatus illustrated in FIG. 1 comprises an image generator 1, on which an original image is shown, on the basis of which a virtual image is to be generated using the imaging apparatus, which virtual image can be perceived by a person wearing the smartglasses as if it were floating in space in front of his eyes. The imaging apparatus comprises a prism 3 and a spectacle lens 5. Starting from the image generator, the imaging beam path, which is represented in the figure by the chief rays traveling from the corner points and the center of the image generator 1, enters the prism 3 via a prism entrance surface 7. Inside the prism 3, it is reflected via three reflection surfaces 9, 11 and 13 in the direction of the outer surface 15 of the spectacle lens 5. After multiple reflection of the chief rays between the spectacle lens outer surface 15 and the spectacle lens inner surface 17, the beam path is eventually guided to an output coupling element 19 of the spectacle lens 5, from where it is coupled out through a portion 18 of the spectacle lens inner surface in the direction of the eye of the user wearing the smartglasses. The eye is not illustrated in FIG. 1. However, it does show the eye box 21, which represents the region in which the eye pupil can move without vignetting of the image being perceived.

In the imaging apparatus of the prior art, illustrated in FIG. 1, the prism entrance surface 7 and the reflection surfaces 9, 11 and 13 of the prism are configured as freeform surfaces that contribute to the image forming of the virtual image. Therefore, they are referred to as image-forming surfaces below.

Figure 2:
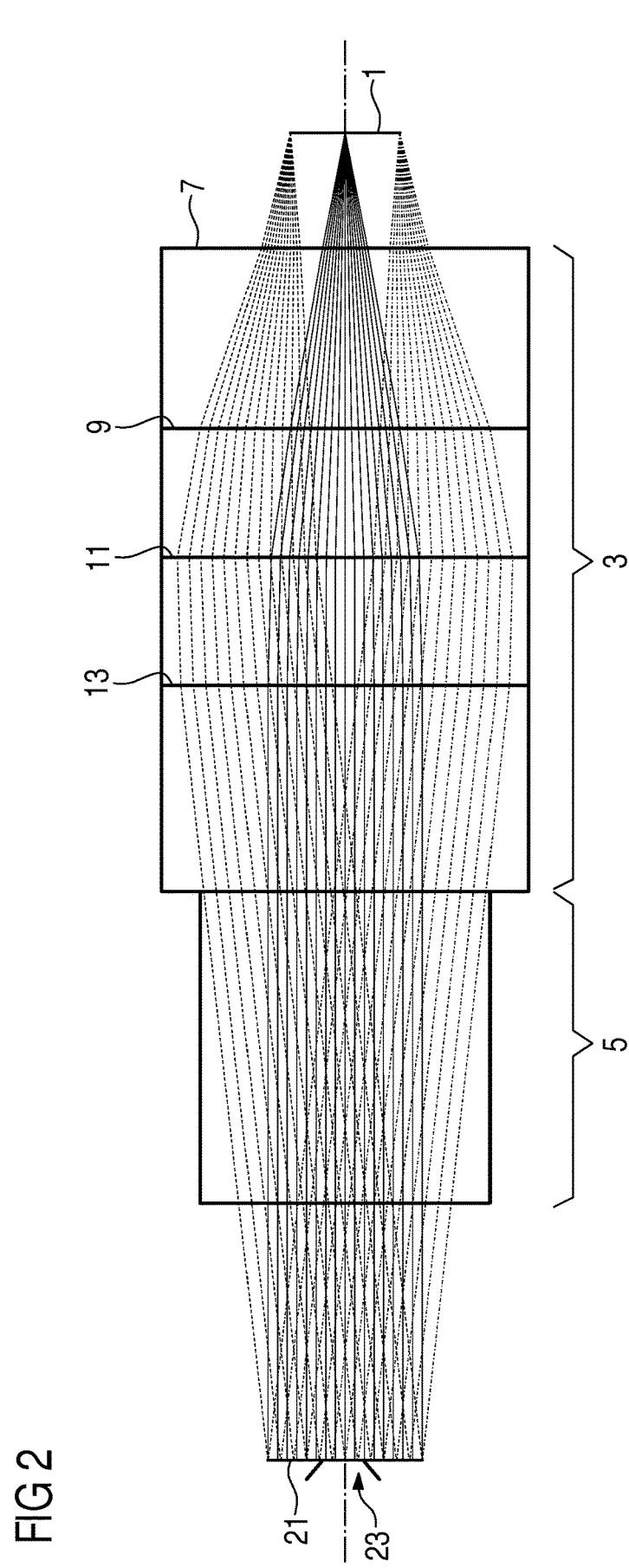
FIG. 2 shows a highly schematic illustration of the smartglasses from FIG. 1 and the light tube defining the eye box.

For illustrative purposes, the imaging apparatus from FIG. 1 is unfolded in FIG. 2 and illustrated with paraxial lens elements rather than the freeform surfaces. FIG. 2 additionally indicates the eye pupil 23. The optical requirements for the freeform surfaces of the prism 3 more or less correspond to the optical requirements for the lens element surfaces of a high-performance eyepiece. The illustration of FIG. 2 illustrates that a significant structural length of the prism is required to obtain a high-quality imaging in the entire eye box 21.

Even though it is possible in theory to obtain the optical effect of the freeform surfaces 7 to 13 with a single surface 9' (see FIG. 3) and to reduce the structural length of the prism 3 in this way, the ray deflection that is to be caused by this surface 9' would then be significantly greater than the ray deflections that are to be caused by the individual surfaces 7 to 13. This would result in a significantly higher requirements for the surface 9' than for the surfaces 7 to 13, which very significantly increases the manufacturing outlay and, as a consequence, prevents the practical implementation of this solution. For a practical implementation, the requirements in terms of the optical quality of the surface 9' should be reduced, which could be accomplished only by significantly reducing the aperture ratio of the imaging surface 9'. Since the focal length of the lens element 9' must not change in the case of specified imaging ratios with respect to the eye box, the field angles, the focal length and the correction of the imaging, the only option that remains is to reduce the free cross-section thereof, as is illustrated in FIG. 4. When reducing the free diameter of the image-forming surface (now image-forming surface 9'' in FIG. 4), the eye box 21 would no longer be completely filled, however, meaning that image contents would be lost. As is clear from FIG. 4, an observer whose eye pupil 23 is located in the center of the eye box 21 would only see the central part of the original image illustrated on the image generator 1. In order to also be able to see the peripheries of the original image, the observer would have to shift his eye pupil 23 to the periphery of the eye box 21.

Figure 3:
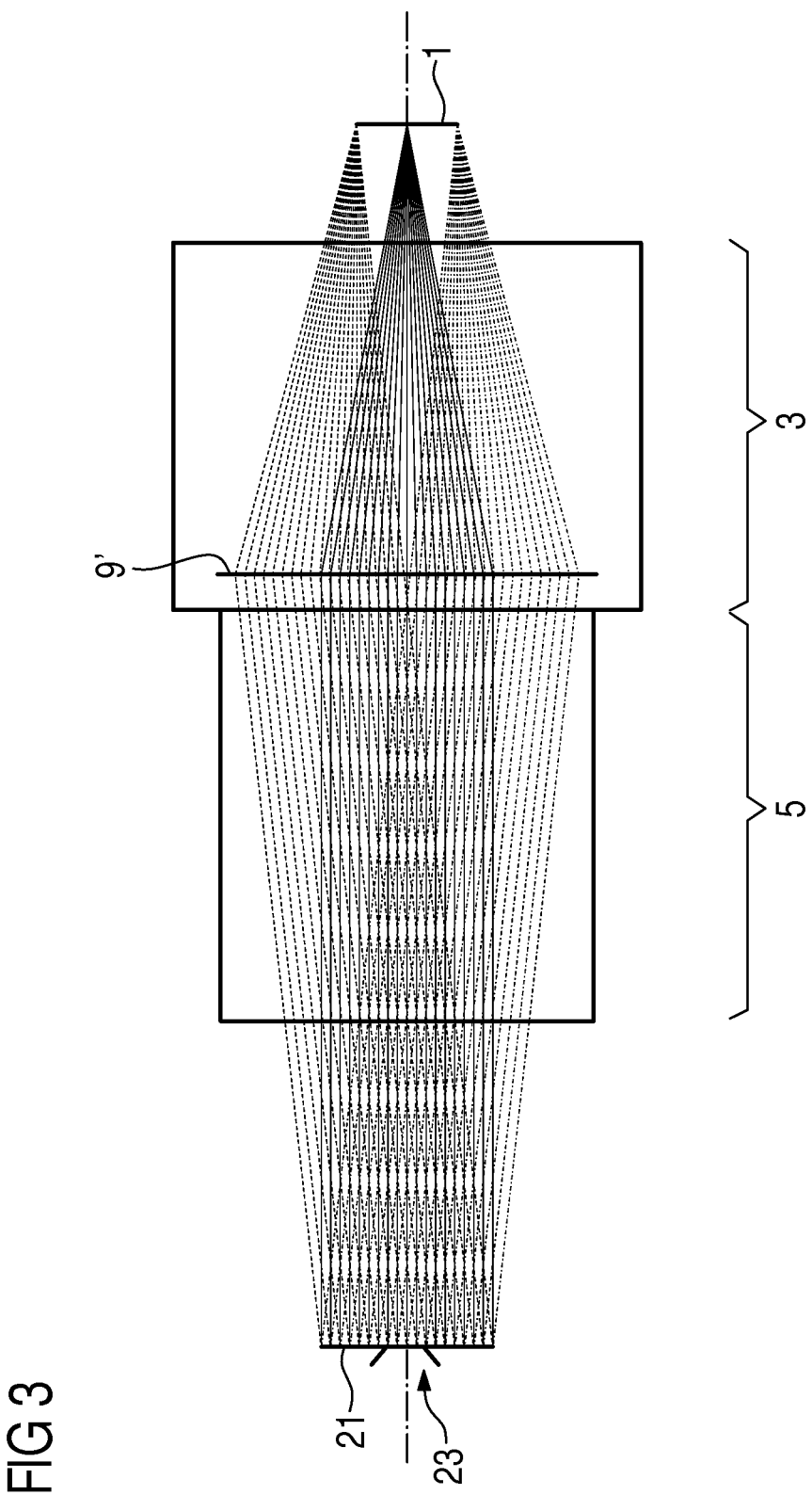
FIG. 3 shows a further simplification of the illustration of the smartglasses from FIG. 2.
Figure 4:
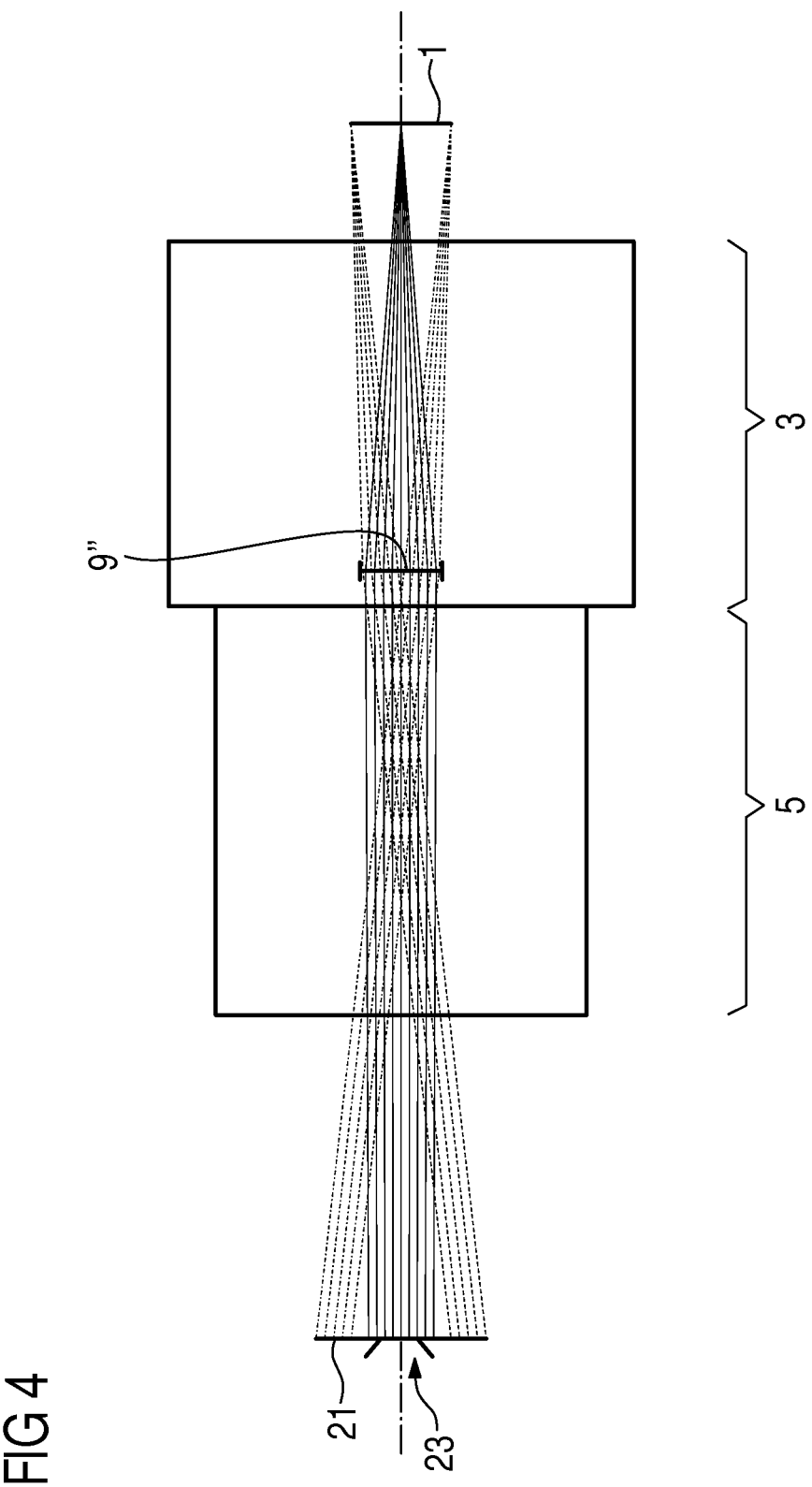
FIG. 4 shows an illustration of the smartglasses from FIG. 3 with a reduced image-forming surface.
Figure 5:
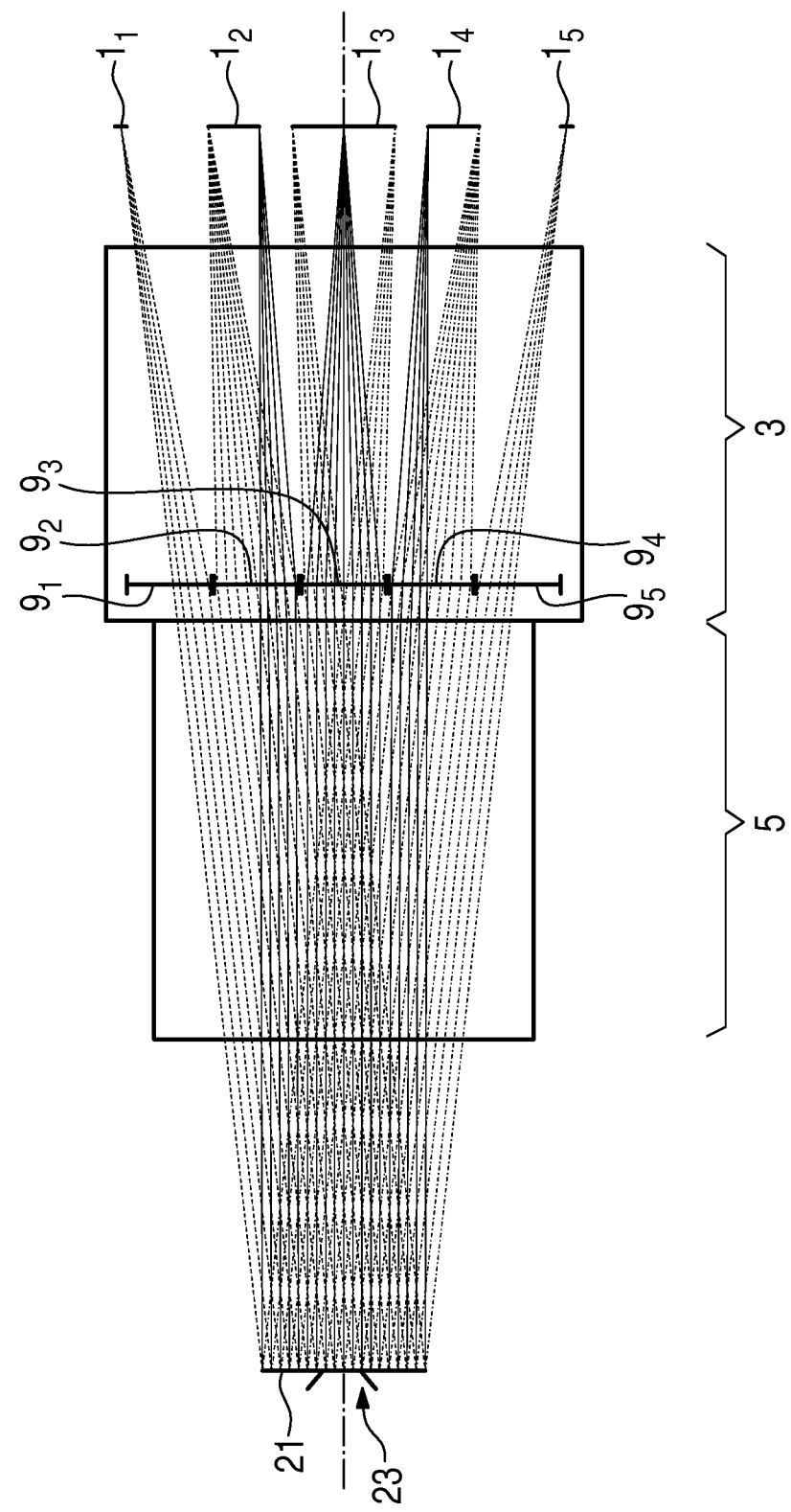
FIG. 5 shows a highly schematic illustration of an imaging apparatus according to certain embodiments of the invention for smartglasses.

To prevent the eye box from not being filled completely, a plurality of image-forming individual surfaces $9_1$ to $9_5$ are distributed according to the present invention over the cross section of the image-forming surface 9' of FIG. 3. In addition, the image generator 1 is divided into a plurality of image generator elements $1_1$ to $1_5$. Said image generator elements $1_1$ to $1_5$ represent image sections of the original image with partially overlapping image regions. The image generator elements $1_1$ to $1_5$ can be a number of separate image generators $1_1$ to $1_5$, as illustrated in FIG. 5, which together form an image generator element arrangement. However, there is also the option of providing, as an image generator element arrangement, a single image generator that is as large as the image generator element arrangement in FIG. 5 and has image generator regions that correspond to the image generator elements $1_1$ to $1_5$ from FIG. 5 and on which in each case a different original partial image is represented. A combination of these two embodiment variants is likewise possible. Said image generator regions can be separated by image generator regions on which no original partial images are represented. The image generator regions on which no original partial images are represented in this case correspond to the regions between the separate image generators $1_1$ to $1_5$ from FIG. 5.

If the image generator element arrangement consists of a number of separate image generator elements $1_1$ to $1_5$, they can be arranged, as shown in FIG. 5, either in a common plane or, if for example the requirements in terms of installation space do not permit the arrangement of the image generator elements $1_1$ to $1_5$ all in one plane, they can be arranged in different planes. In the latter case, deflection elements may then be present with which the beam paths coming from the individual image generator elements $1_1$ to $1_5$ are aligned with respect to one another.

In the imaging apparatus illustrated in FIG. 5, as many image-forming surfaces $9_1$ to $9_5$ are present as there are image generator elements $1_1$ to $1_5$ present. The original partial images illustrated by the individual image generators $1_1$ to $1_5$ are then imaged via separate imaging channels. In this way, the original partial image represented on the image generator element $1_1$ is imaged by the image-forming surface $9_1$, the original partial image represented on the image generator element $1_2$ is imaged by the image-forming surface $9_2$, the original partial image represented by the image generator element $1_3$ is imaged by the image-forming surface $9_3$, and so on. In other words, each original partial image is transmitted via a different imaging channel. This makes it possible to fill out the entire eye box, wherein the requirements for the surfaces $9_1$ to $9_5$ are in each case considerably lower than the requirements that would apply to a surface 9' as is illustrated in FIG. 3.

In the imaging apparatus illustrated in FIG. 5, the beams that contribute to the imaging are transmitted depending on the position of the eye pupil 23 in the eye box 21 by different imaging channels. This is illustrated in FIGS. 6 and 7, with FIG. 6 showing an eye pupil 23 in the center of the eye box and also the associated transmission channels, and FIG. 7 showing an eye pupil 23 at the periphery of the eye box 21 and also the associated transmission channels.

Figure 6:
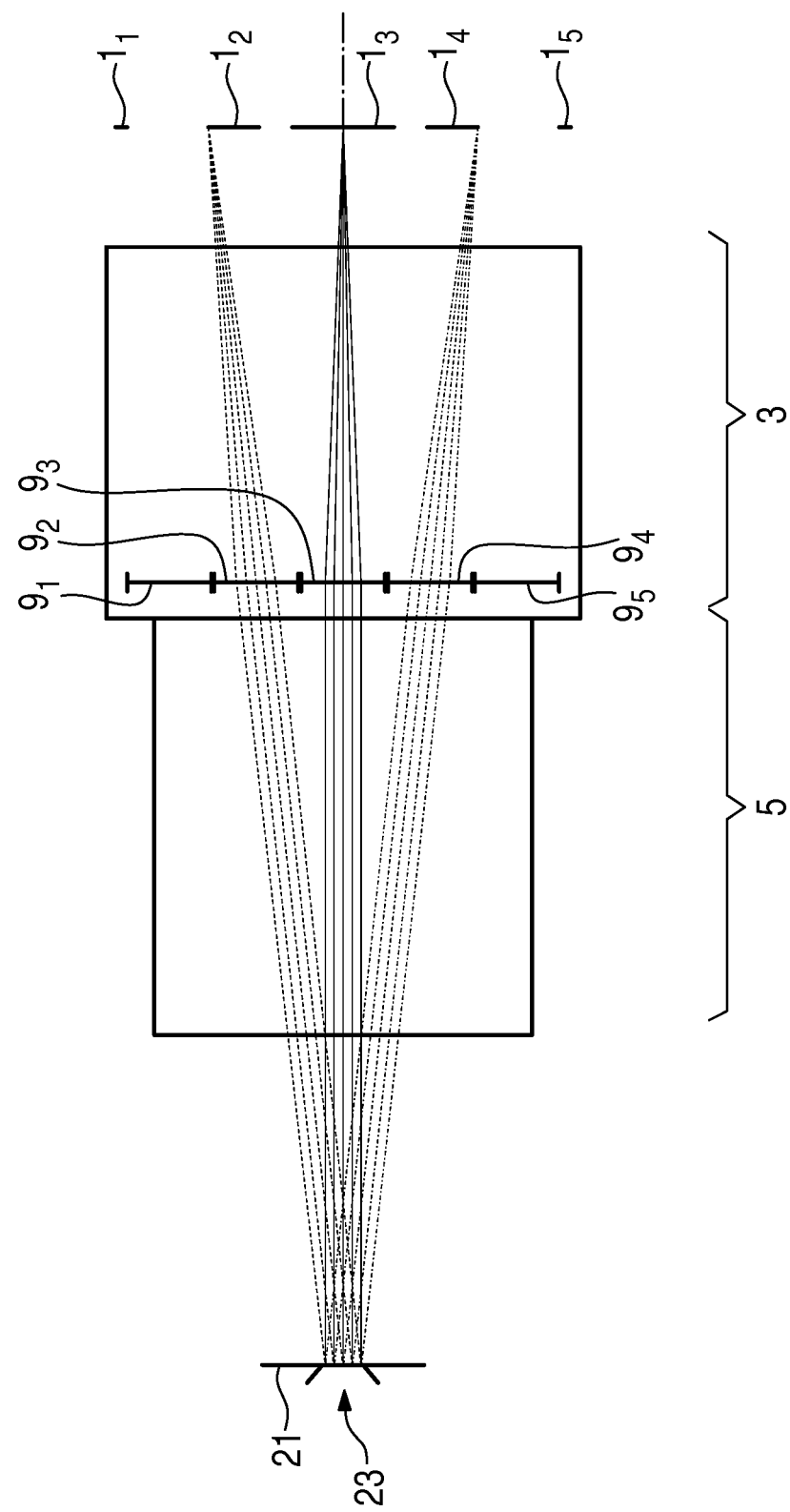
FIG. 6 shows the imaging apparatus from FIG. 5 together with the beam path for a pupil position in the center of the eye box.
Figure 7:
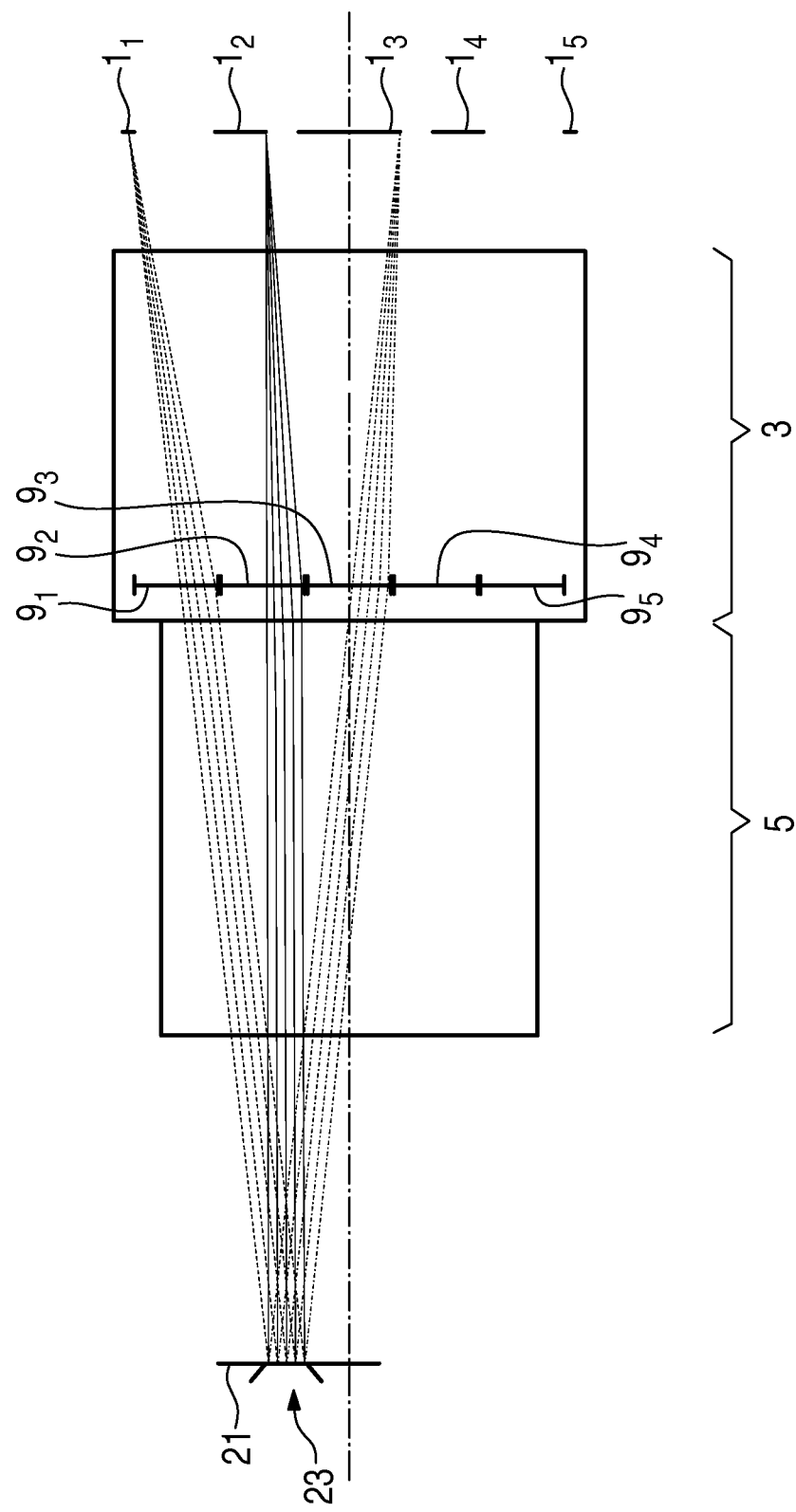
FIG. 7 shows the imaging apparatus from FIG. 5 together with a beam path for a pupil position at the periphery of the eye box.
Figure 8:
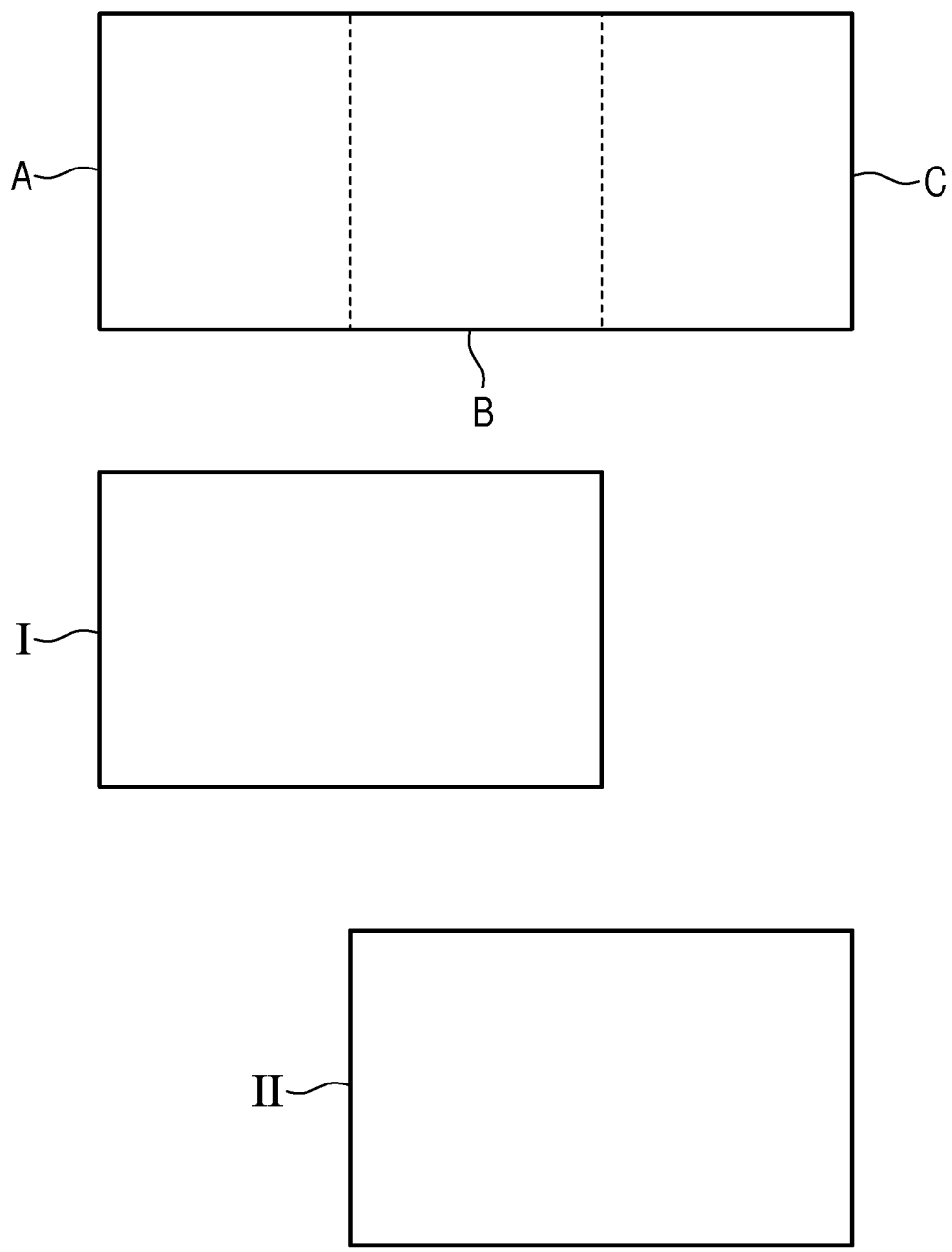
FIG. 8 shows an illustration for explaining the transmission of different image sections of an original image with the use of image generator elements having the same size.
Figure 9:
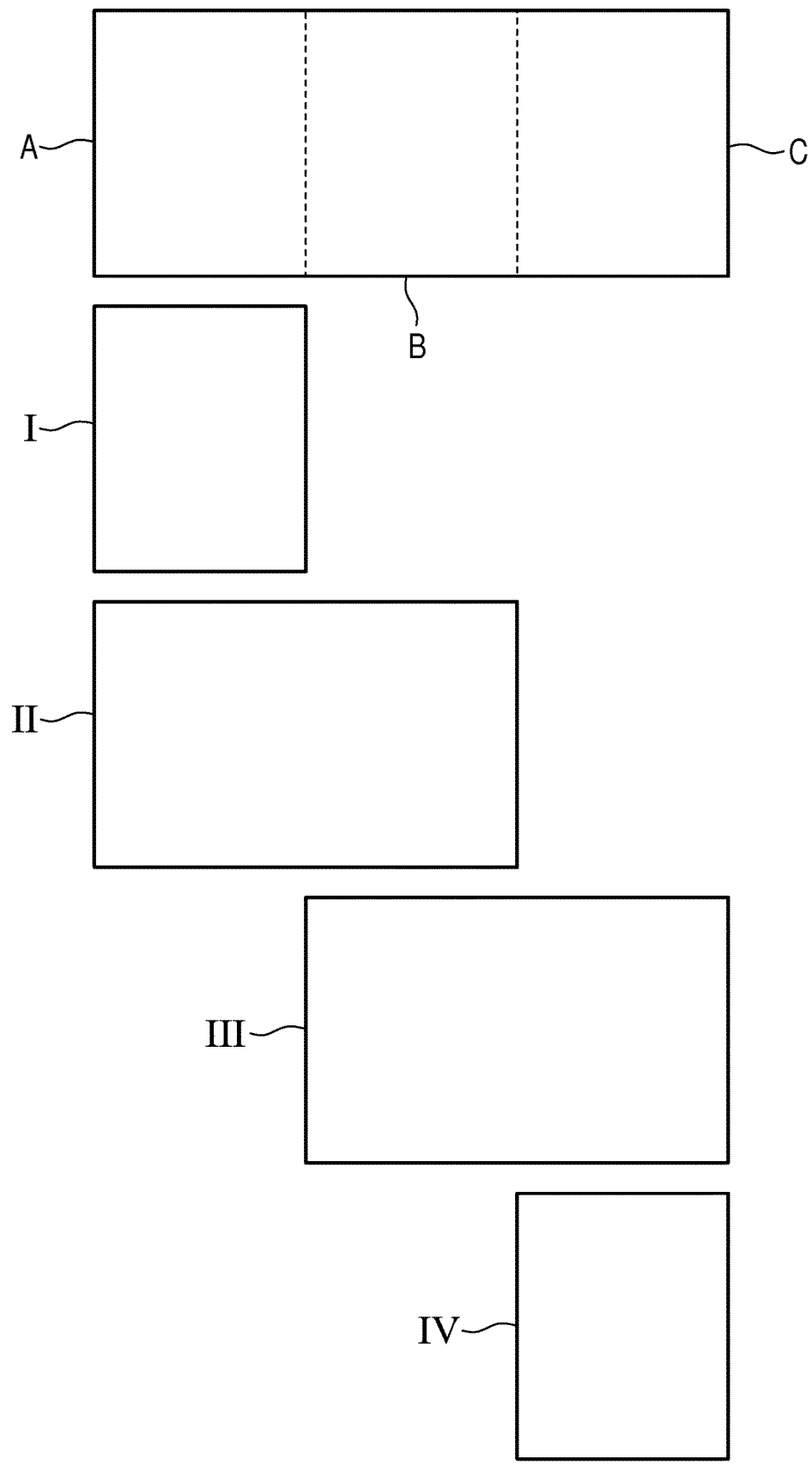
FIG. 9 shows the transmission of different image sections of an original image with the use of image generator elements having different sizes.

As is clear from FIGS. 5 to 7, image generator elements $1_1$, $1_5$, which are located at the periphery of the image generator element arrangement, have smaller image generator surfaces than image generator elements located in the center of the image generator element arrangement, such as the image generator element $1_3$. The image generator surfaces of the image generator elements $1_1$ to $1_5$ here decrease in terms of area from the center of the image generator element arrangement to the periphery thereof. In this way, it can be ensured that the image that is transmitted via a plurality of imaging channels has the same image brightness in the entire eye box 21. This will be explained in more detail below with reference to FIG. 8. FIG. 8 shows an original image showing a plurality of image regions A, B, and C. The image regions A; B, and C are disjunct in the original image. If of two equal-sized image generator elements I, II in each case an original partial image with an image section showing the image regions A, B (image generator element I) and with an image section showing the image regions B, C (image generator element II) are then represented and transmitted via two associated imaging channels, the image section B is transmitted both via the imaging channel that is associated with the image generator element I and also via the imaging channel that is associated with the image generator element II. By contrast, the image regions A and C are transmitted only by the imaging channel that is associated with the image generator element I and by the imaging channel that is associated with the image generator element II, respectively. As a result, the central image region B is perceived as brighter by a user of the smartglasses than the image regions A and C located at the periphery. To prevent this from happening, the image generator surfaces of the image generator elements $1_1$ to $1_5$ decrease in terms of area in the direction of the periphery of the image generator element arrangement in the imaging apparatus. As shown in FIG. 9, it is hereby possible to ensure that all image sections A, B, C are transmitted via the same number of imaging channels, specifically the image section A via the imaging channels associated with the image generator elements I and II, the image section B via the imaging channels associated with the image generator elements II and III, and the image section C via the imaging channels associated with the image generator elements III and IV. Consequently, each image section is thus transmitted via two imaging channels, and each image section is consequently perceived by the user of the smartglasses containing the imaging apparatus as being of equal brightness.

Figure 10:
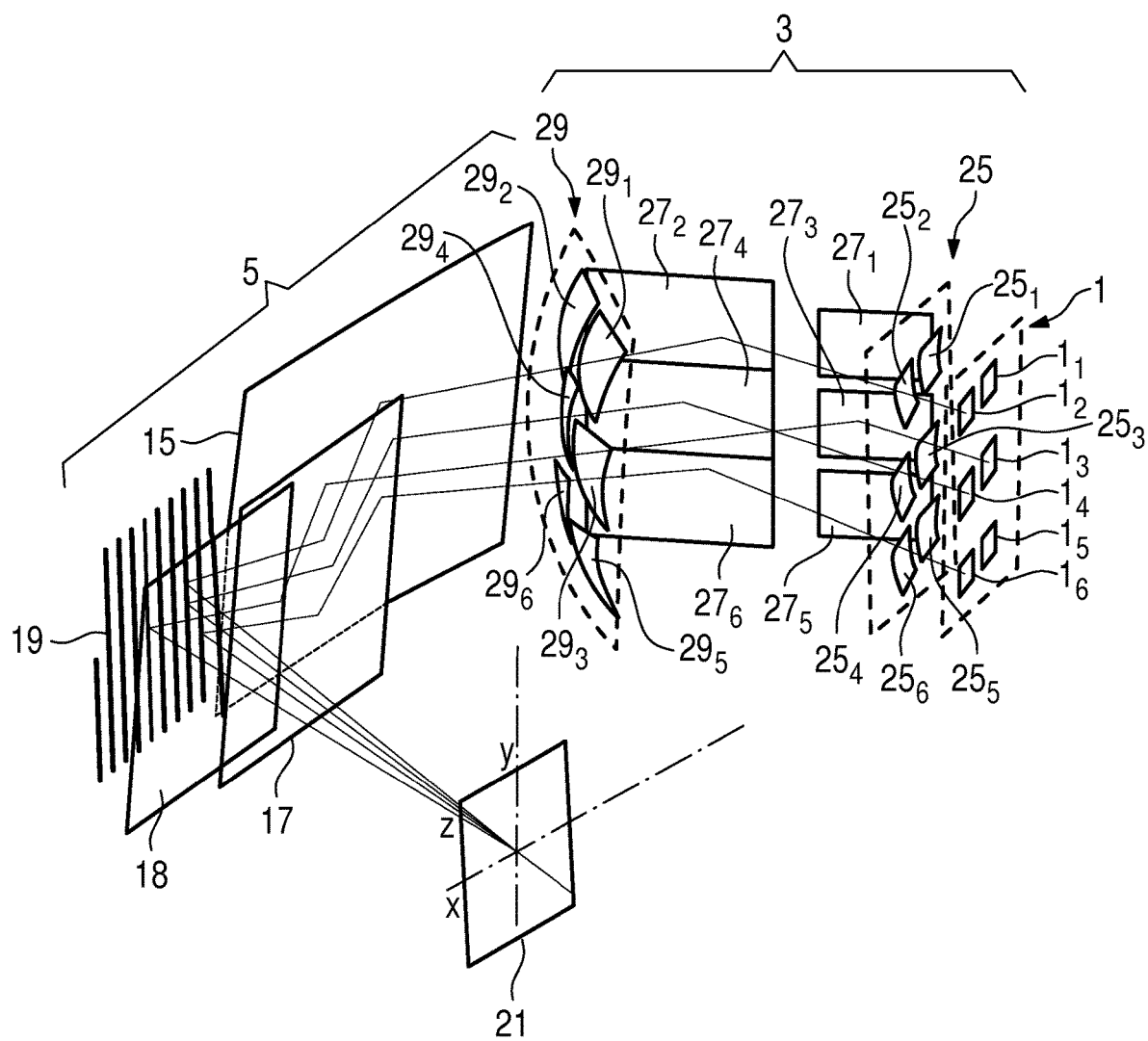
FIG. 10 shows a schematic illustration of the relevant surfaces of an imaging apparatus according to certain embodiments of the invention for smartglasses.

Although the imaging channels in FIGS. 5 to 7 have only one image-forming surface $9_1$ to $9_5$ each, a plurality of image-forming surfaces per imaging channel will typically be present for practical reasons. One exemplary embodiment of a prism 3, as can be used for an imaging apparatus of smartglasses, is shown in FIG. 10. In this exemplary embodiment, the image generator 1 has six image generator elements $1_1$ to $1_6$, on which original partial images with partially overlapping image regions of the original image are represented. The prism has a prism entrance surface 25 having partial surfaces $25_1$ to $25_6$, which are associated with the individual image generator elements $1_1$ to $1_6$ and serve as image-forming refraction surfaces. Furthermore, the individual image generator elements $1_1$ to $1_6$ are associated with reflection surfaces $27_1$ to $27_6$ in the prism 3, which serve as image-forming reflection surfaces. Output coupling from the prism 3 and input coupling to a spectacle lens entrance surface of the spectacle lens 5 are effected via a prism exit surface 29, which has partial surfaces $29_1$ bis $29_6$ that are associated with the individual image generator elements $1_1$ to $1_6$ and each serve as an image-forming refraction surface. The refractive and reflective surfaces, which are associated with the respective image generator elements $1_1$ to $1_6$, each form an imaging channel that is associated with the corresponding image generator element.

In the present exemplary embodiment, only one imaging channel, which substantially corresponds to the imaging channel as has been described with reference to FIG. 1, is present in the spectacle lens 5 for all image generator elements $1_1$ to $1_6$.

To have as much leeway as possible when correcting the imaging, the image-forming surfaces $25_1$ to $25_6$, $27_1$ to $27_6$, and $29_1$ to $29_6$ are configured as freeform surfaces that satisfy the following equation:

$$z = \frac{c \cdot r^2}{1 + \sqrt{1 - (1+k) \cdot c^2 \cdot r^2}} + \sum_{i=1}^{N} A_i(x, y)$$

where $r^2 = x^2 + y^2$

Here, c indicates the curvature and k is the conicity of a surface. $A_i$ denotes the coefficients of the freeform surface, and x and y denote the surface coordinate in a Cartesian coordinate system. In the exemplary embodiment shown in FIG. 10, there are two refractive surfaces $25_1$ to $25_6$ and 29-1 to 29-6 and one reflective surface $27_1$ to $27_6$ per channel. The entrance and exit surfaces 25 and 29 of the prism 3 are in each case located closely together, which means that the six imaging channels can be produced integrally as an injection-molded part. The image generator arrangement 1 can, as already mentioned, consist of a number of image generator elements $1_1$ to $1_6$ or of a large image generator, in which the original partial images are imaged onto different image generator regions.

For illustrative purposes, the present invention has been described in detail with reference to exemplary embodiments. However, a person skilled in the art will know that it is possible to deviate from the described exemplary embodiments without departing from the scope of the present invention. For example, a different number of image generator elements and imaging channels or a different number of image-forming surfaces per imaging channel can be provided. For this reason, the present invention should not be limited to the exemplary embodiments, but merely by the appended claims.

The invention claimed is:

1. An imaging apparatus for smartglasses for generating a virtual image from an original image, which is divided into at least two original partial images, the imaging apparatus comprising:
    an image generator element arrangement comprising a number of image generator elements for representing a corresponding number of original partial images;
    a number of imaging channels comprising in each case at least one image-forming reflection surface or at least one image-forming refraction surface or both, the number of imaging channels corresponding to the number of image generator elements,
    wherein each of the imaging channels is associated with one of the image generator elements and configured to transmit one of the original partial images; and
    a spectacle lens, which is common to all of the imaging channels and via which the imaging channels are directed in the direction of an observer's eye,
    wherein the image-forming reflection surfaces or the refraction surfaces of the imaging channels, or both, are surfaces of a prism that is arranged on the spectacle lens
    wherein the original partial images of at least two image generator elements represent image sections of the original image with partially overlapping image regions,
    wherein the image generator elements are located side-by-side,
    wherein the overlapping image regions are transmitted via at least two different imaging channels, and
    wherein image generator elements located at a periphery of the image generator element arrangement have a smaller image generator surface and represent smaller image sections of the original image than image generator elements that are located further in a center of the image generator element arrangement.

2. The imaging apparatus of claim 1, wherein a central image generator element is present, which represents the entire original image.

3. The imaging apparatus of claim 1,
wherein the image generator element arrangement comprises a number of separate image generators, and
wherein each of the separate image generators forms an image generator element of the image generator element arrangement.

4. The imaging apparatus of claim 1,
wherein the image generator element arrangement comprises a single image generator, and
wherein the image generator elements are image generator regions of the image generator on which in each case a different one of the original partial images is represented.

5. The imaging apparatus of claim 1,
wherein the prism comprises a prism entrance surface, facing the image generator element arrangement, and a prism exit surface, facing a spectacle lens entrance surface of the spectacle lens, and
wherein the imaging channels are coupled out of the prism via the prism exit surface and are coupled into the spectacle lens via the spectacle lens entrance surface.

6. The imaging apparatus of claim 5, wherein each imaging channel comprises a portion of the prism entrance surface and a portion of the prism exit surface as image-forming refraction surfaces and an image-forming reflection surface, which is located between its portion of the prism entrance surface and its portion of the prism exit surface, is present for each imaging channel.

7. The imaging apparatus of claim 6, wherein each imaging channel additionally comprises a portion of the spectacle lens entrance surface as an image-forming refraction surface.

8. Smartglasses comprising an imaging apparatus according to claim 1.

9. A method for generating an image from an original image in smartglasses, the method comprising:
providing an imaging apparatus according to claim 1;
dividing the original image into a number of original partial images; and
transmitting each of the original partial images via a separate imaging channel formed in the prism to generate the virtual image.

10. The method of claim 9, wherein at least two original partial images represent image sections of the original image with overlapping image regions, such that the overlapping image regions of the image sections are transmitted via at least two different imaging channels.

11. The method of claim 10, wherein original partial images that are located at the periphery of the original image represent smaller image sections of the original image than original partial images that are located further in the center of the original image.

12. The method of claim 11, wherein a central original partial image represents the entire original image as an image section.

13. An imaging apparatus for smartglasses for generating a virtual image from an original image, which is divided into at least two original partial images, the imaging apparatus comprising:
an image generator element arrangement comprising a number of image generator elements for representing a corresponding number of original partial images;
a number of imaging channels comprising in each case at least one image-forming reflection surface or at least one image-forming refraction surface or both, the number of imaging channels corresponding to the number of image generator elements,
wherein each of the imaging channels is associated with one of the image generator elements and configured to transmit one of the original partial images; and
a spectacle lens, which is common to all of the imaging channels and via which the imaging channels are directed in the direction of an observer's eye,
wherein the image-forming reflection surfaces or the refraction surfaces of the imaging channels, or both, are surfaces of a prism that is arranged on the spectacle lens
wherein a central image generator element is present, which represents the entire original image,
wherein further image generator elements are present in addition to the central image generator element, and
wherein each of the further image generator elements shows only parts of the original image.

14. Smartglasses comprising an imaging apparatus according to claim 13.

15. A method for generating an image from an original image in smartglasses, the method comprising:
providing an imaging apparatus according to claim 13;
dividing the original image into a number of original partial images; and
transmitting each of the original partial images via a separate imaging channel formed in the prism to generate the virtual image.

16. An imaging apparatus for smartglasses for generating a virtual image from an original image, which is divided into at least two original partial images, the imaging apparatus comprising:
an image generator element arrangement comprising a number of image generator elements for representing a corresponding number of original partial images;
a number of imaging channels comprising in each case at least one image-forming reflection surface or at least one image-forming refraction surface or both, the number of imaging channels corresponding to the number of image generator elements,
wherein each of the imaging channels is associated with one of the image generator elements and configured to transmit one of the original partial images; and
a spectacle lens, which is common to all of the imaging channels and via which the imaging channels are directed in the direction of an observer's eye,
wherein the image-forming reflection surfaces or the refraction surfaces of the imaging channels, or both, are surfaces of a prism that is arranged on the spectacle lens,
wherein the image generator element arrangement comprises a single image generator, and
wherein the image generator elements are image generator regions of the image generator on which in each case a different one of the original partial images is represented.

17. Smartglasses comprising an imaging apparatus according to claim 16.

18. A method for generating an image from an original image in smartglasses, the method comprising:
providing an imaging apparatus according to claim 16;
dividing the original image into a number of original partial images; and
transmitting each of the original partial images via a separate imaging channel formed in the prism to generate the virtual image.

19. An imaging apparatus for smartglasses for generating a virtual image from an original image, which is divided into at least two original partial images, the imaging apparatus comprising:

an image generator element arrangement comprising a number of image generator elements for representing a corresponding number of original partial images;

a number of imaging channels comprising in each case at least one image-forming reflection surface or at least one image-forming refraction surface or both, the number of imaging channels corresponding to the number of image generator elements, wherein each of the imaging channels is associated with one of the image generator elements and configured to transmit one of the original partial images; and a spectacle lens, which is common to all of the imaging channels and via which the imaging channels are directed in the direction of an observer's eye, wherein the image-forming reflection surfaces or the refraction surfaces of the imaging channels, or both, are surfaces of a prism that is arranged on the spectacle lens wherein the prism comprises a prism entrance surface, facing the image generator element arrangement, and a prism exit surface, facing a spectacle lens entrance surface of the spectacle lens, and wherein the imaging channels are coupled out of the prism via the prism exit surface and are coupled into the spectacle lens via the spectacle lens entrance surface.

20. Smartglasses comprising an imaging apparatus according to claim 19.

21. A method for generating an image from an original image in smartglasses, the method comprising:

providing an imaging apparatus according to claim 19;

dividing the original image into a number of original partial images; and transmitting each of the original partial images via a separate imaging channel formed in the prism to generate the virtual image.

22. The imaging apparatus of claim 19, wherein each imaging channel comprises a portion of the prism entrance surface and a portion of the prism exit surface as image-forming refraction surfaces and an image-forming reflection surface, which is located between its portion of the prism entrance surface and its portion of the prism exit surface, is present for each imaging channel.

23. The imaging apparatus of claim 22, wherein each imaging channel additionally comprises a portion of the spectacle lens entrance surface as an image-forming refraction surface.

* * * * *